United States Patent [19]

La Combe et al.

[11] 3,816,198

[45] June 11, 1974

[54] SELECTIVE PLASMA ETCHING OF ORGANIC MATERIALS EMPLOYING PHOTOLITHOGRAPHIC TECHNIQUES

[76] Inventors: Donald J. La Combe, 145 Robbins Ln., DeWitt, N.Y. 11324; Guy L. Babcock, 33 Homeland Rd., North Syracuse, N.Y. 11322

[22] Filed: June 7, 1971

[21] Appl. No.: 150,504

Related U.S. Application Data

[63] Continuation-in-part of Ser. No. 859,870, Sept. 22, 1969, abandoned.

[52] U.S. Cl. .................... 156/16, 156/17, 204/164, 204/192

[51] Int. Cl. .......................... C23f 1/02, B01k 1/00

[58] Field of Search ........... 204/192, 164; 156/2, 17

[56] References Cited

UNITED STATES PATENTS 3,474,021 10/1969 Davidse et al. .................... 204/192

*Primary Examiner*—Howard S. Williams
*Assistant Examiner*—D. R. Valentine
*Attorney, Agent, or Firm*—Richard V. Lang; Carl W. Baker; Frank L. Neuhauser

[57] ABSTRACT

A method is disclosed for selective plasma etching an organic material. Etching is achieved by means of a low temperature plasma which reacts with the organic material through an apertured mask overlaying said material. The invention has particular application to electronic circuit fabrication. A large magnitude, alternating electric field is applied to a reaction chamber for generating an intense low temperature plasma in the region of the organic material. A preferred organic material is a polymer of fluorinated ethylene propylene and a suitable mask is a photoresist composition.

9 Claims, 7 Drawing Figures

INVENTORS:
DONALD J. LaCOMBE,
GUY L. BABCOCK,
BY [signature]
THEIR ATTORNEY.

INVENTORS:
DONALD J. LaCOMBE,
GUY L. BABCOCK,

BY [signature]
THEIR ATTORNEY.

SELECTIVE PLASMA ETCHING OF ORGANIC MATERIALS EMPLOYING PHOTOLITHOGRAPHIC TECHNIQUES

The present application is a continuation-in-part of U.S. Pat. application Ser. No. 859,870, filed Sept. 22, 1969 by Donald J. LaCombe and Guy L. Babcock entitled "Selective Plasma Etching of Organic Materials Employing Photolithographic Techniques", now abandoned.

BACKGROUND OF THE INVENTION:

1. Field of the Invention

The invention relates to the field of plasma decomposition of organic materials, and more specifically to the use of plasmas in the processing of electronic circuit components.

2. Description of the Prior Art

Plasmas have been employed in sample analysis for reducing materials of various compositions to an inorganic residue. In this process, a reaction of a material's organic constituents is performed at relatively low temperatures forming gaseous products but leaving intact and unaffected the inorganic constituents for subsequent elemental analysis. More recently, plasma reaction has been employed in semiconductor processing, for the gross removal of photoresist material from a surface after etching. In certain of these prior art devices, appreciable energy is coupled to the plasma, on the order of several hundred to several thousand watts, which heats the organic samples to on the order of 100° to 500°C.

SUMMARY OF THE INVENTION

It is a principal object of the invention to provide a novel method for selectively plasma etching organic material.

It is a further object of the invention to provide a novel method for plasma etching an organic layer in an electronic circuit.

It is another object of the invention to provide a novel method having low energy requirements for producing intense low temperature plasma generated within a restricted volume for efficiently etching organic material.

It is another object of the invention to provide a novel method as above described for selectively etching fluorinated ethylene propylene.

These and other objects of the invention are accomplished by a low temperature plasma generating system which includes a plasma reaction chamber within which is mounted an organic sample to be plasma etched. A flow of gas at a pressure in the range of from 70 to 300 microns is provided over the sample. Overlaying the surface of the organic material is an apertured mask that is appreciably less susceptible to plasma attack than is said organic material. The plasma acts to selectively etch the organic material through the apertures of said mask.

In one form of an apparatus for practicing the inventive method, a resonant induction coil is employed to generate an extremely high alternating electric field, having a voltage in the order of 50 to 100 KV and at several MHz, which field is applied to the reaction chamber for generating an intense, low temperature plasma in the region above the said sample. The alternating electric field is established by means of a planar electrode insulated from the plasma and arranged so that the etched layer is approximately one electron mean free path from the insulated surface. This places the organic layer in the region of the plasma where the most active gaseous species are present and aids in achieving efficient low temperature etching. A preferred masking material is a photoresist and a preferred organic sample is a fluorinated polymer such as fluorinated ethylene propylene.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

Figure 1:
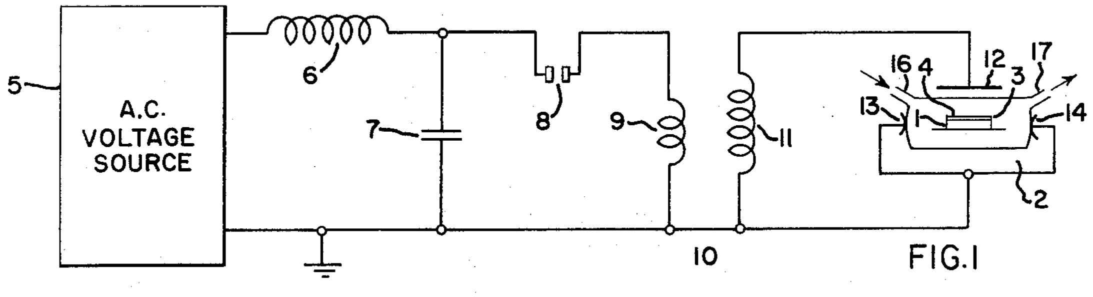
FIG. 1 is a schematic diagram of a plasma generating system, in accordance with the invention.

DESCRIPTION OF THE PREFERRED EMBODIMENTS:

In FIG. 1 there is illustrated a schematic diagram of a high frequency plasma generating system which is employed to selectively plasma etch the organic material of a body member 1 mounted in a plasma reaction chamber 2. A Tesla coil arrangement is employed to generate a plasma within the chamber 2. The organic material of member 1 consists of a cover layer 3 and has an apertured mask 4 deposited on the upper surface. The body member 1 is shown in greater detail in FIGS. 2A and 2B, to be considered presently. In the system of FIG. 1 a low temperature plasma is generated principally in the region above the body member 1 which selectively etches the organic layer 3 through the apertured mask 4.

The Tesla coil arrangement, which is per se a conventional circuit, includes an a.c. voltage source 5, one terminal of which is connected to ground, and the other terminal connected through an inductor 6 and a capacitor 7 to ground. The junction of inductor 6 and capacitor 7 is connected through an interruptor 8 having a pair of contacts to one terminal of a primary winding 9 of a resonator coil 10, the other terminal of which is connected to ground. The effective opening and closing of the interruptor contacts are controlled by the inductor 6. A secondary winding 11 of the resonator coil 10 has one terminal connected to ground and the opposite terminal connected to a broad electrode 12. The turns ratio of the secondary winding 11 to the primary winding 9 is very large, e.g., in the order of 50:1. The inductance of the winding 11 resonates with the stray capacitance of the winding for generating an extremely high magnitude alternating voltage, in the order of 50 to 100 KV at a frequency of several MHz.

Figures 3, 4:
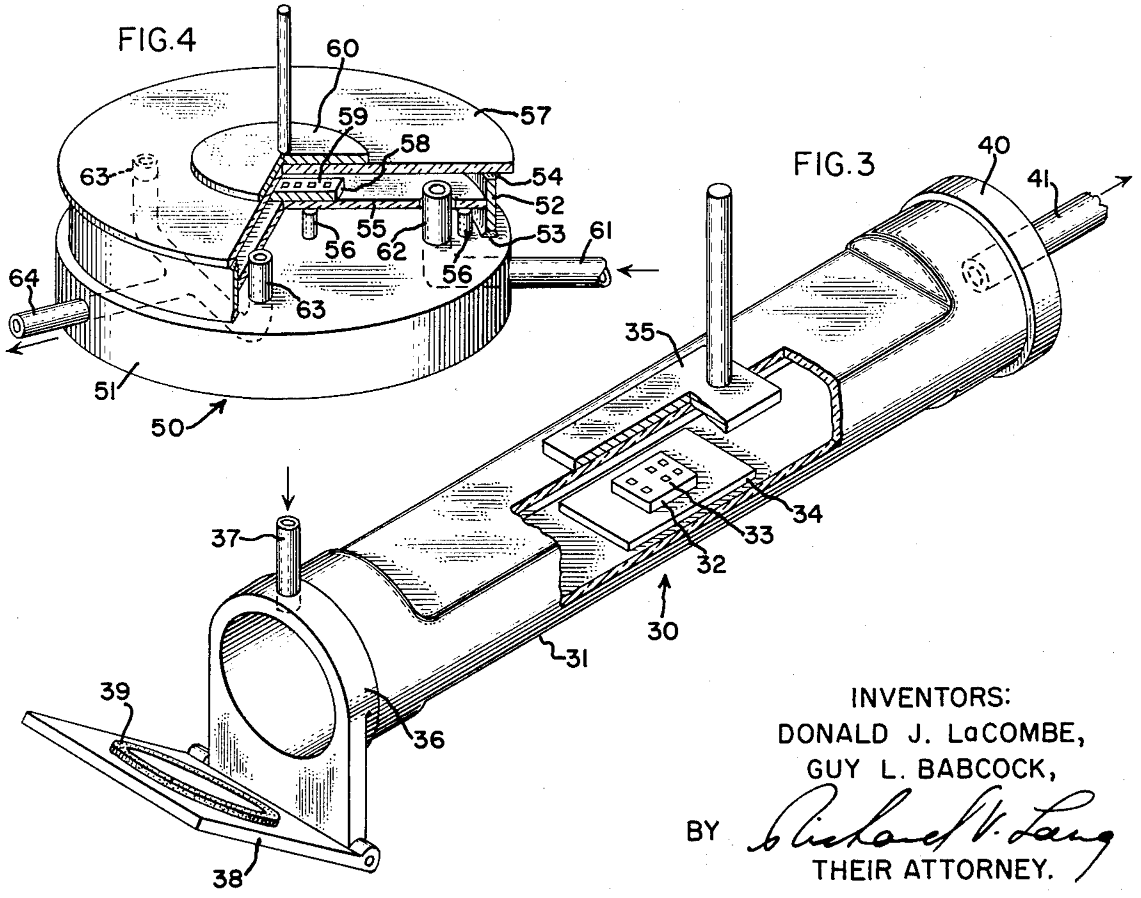
FIG. 3 is a perspective view of one embodiment of a plasma reaction chamber that may be employed in the system of FIG. 1.
FIG. 4 is a perspective view of a second embodiment of a plasma reaction chamber that may be employed in FIG. 1.

Electrode 12 is shown adjacent to the chamber 2 and in parallel with the masked surface of the organic layer 3. In alternative configurations, the electrode 12 may be in contact with the chamber wall or made to extend within the chamber. Further electrodes 13 and 14 having a common ground connection are at either side of the chamber 2 contiguous with the side walls. For purposes of illustration, electrodes 13 and 14 are shown as a pair of discrete elements. However, as will be described in greater detail when considering the plasma reaction structures of FIGS. 3 and 4, these electrodes are constructed as integral portions of the walls of the reaction chamber, and in the embodiment of FIG. 4 are a single element. The alternating electric field generated by the secondary winding 11 is coupled to the plasma reaction chamber 2 by means of the electrodes 12, 13 and 14.

When sputtering of the electrode material onto the organic layer 3 is to be avoided, the electrode 12, in proximity to the layer 3, should be protected from the exposure to the plasma by an insulating layer. This may either be accomplished by placing the electrode on the outside surface of the upper wall of the chamber, as illustrated, or by introducing the electrode within the vacuum chamber but providing an intervening insulating layer. Besides preventing sputtering, an insulating layer introduced between the electrode 12 and the plasma has the additional benefit of introducing a capacitive impedance in series with the relatively low impedance plasma. This added capacitive impedance prevents serious mismatch between the power source and the discharge. If serious mismatch should occur, the power may be reflected back into the power source and not properly absorbed by the plasma.

A flow of gas is provided in the upper region of the chamber 2 around the body member 1, the gas being admitted through an input port 16 and exhausted through an output port 17. The gas is at reduced pressure, normally from 70 to 300 microns of Hg. The gas is broken down by the applied electric field so as to generate an intense plasma which reacts with the organic material. A suitable gas is oxygen.

The generation of a plasma is a well known phenomenon wherein free electrons of the gas under the action of the large high frequency electric field absorb energy and through successive collisions release additional electrons and ions. The action is multiplied many times until a steady state condition is reached through recombination. In the process, the gas is ionized with neutral electrical charge, which is the plasma. The reduced pressure of the gas increases the mean free path of the electrons and thereby facilitates the plasma generation. The plasma generally fills the region between the broad electrode 12 and the electrodes 13 and 14, but the active gaseous species tend to concentrate in the regions in proximity to the electrodes. Through the employment of the described apparatus for generating a large magnitude electric field and the geometry of the electrodes which provide a region above the body member 1 having the largest concentrations of active gaseous species, the plasma etch process can be efficiently performed with low power input, in the order of 30 to 60 watts or less. The generated plasma is of low temperature and has a minimum heating effect upon the body member. The plasma is found to be specific in the etching of differently composed organic materials.

Increased plasma etching activity in the vicinity of the electrodes has been experimentally verified. Experimentation has shown that at a given pressure of gas, maximum etching occurs at a point where the sample surface is approximately an electronic mean-free path from the surface of the chamber adjacent the electrode. The etch rate characteristic changes quite rapidly with distance, a 50 percent variation in distance from optimum reducing the etch rate 20 – 30 percent.

An explanation for this dependence of etching rate upon sample position is believed to arise from the mechanisms described above. When the RF field is established, accelerated electrons collide with gas molecules ionizing the gas and forming ionized species which make up the plasma. The evacuated region thereupon tends to fill with plasma except in close proximity to the electrode of momentarily negative potential.

A virtual boundary to the plasma exists in the region of the momentarily negative electrode. This is attributable to the fact that the electrons must travel a finite distance in the electric field before an ionizing collision with a gas molecule can be expected. The region within one electron mean free path of the electrode is the place where the plasma and its component active species are created. This region then contains the highest density of active gaseous species. In the remainder of the space between the electrodes, the density of active species falls off through recombination. Their presence is evidenced by a diffused glow throughout the vacuum chamber. The densities of active species affect the electric field distribution within the vacuum chamber, their conductivity tending to form a low impedance path coextensive with the plasma. This low impedance reduces the electric field within the plasma and concentrates the applied high voltage field at the plasma boundary. The strong field at the boundary increases the local population of high velocity electrons whose collisions produce active gaseous species and thus stabilizes the site for the creation of the greatest number of active species in this region. Because the excitation is of an a.c. nature, conditions for the creation of active species are re-established in the vicinity of the planar electrode 12 during one phase of each cycle.

The active species which are normally present in the plasma are differing forms of oxygen including (O), $O_2$ and $O_3$ at several levels of ionization and excitation. In addition, the plasma contains the reaction products arising from the etching process. The gaseous species contributing most to the etching process appears to be monatomic oxygen (O). One may employ other known gaseous elements. Oxygen works well and the reaction products formed are readily removed.

The foregoing optimization of sample position is premised upon a prior selection of the pressure within the vacuum chamber. Experience has shown that the etching rate is unnecessarily too slow at pressures below 70 microns of mercury and that the etching rate increases quite rapidly as one increases the pressure to about 300 microns. At above 300 microns of mercury, one finds the gap (0.070 inches), required to optimize the rate, to be too small. At this distance, a sample tends to vibrate in the field, or to adhere to the wall of the chamber. In general, mechanical reasons make the etching harder to control at higher pressures. A practical upper working limit appears to be at about 300 microns pressure.

In addition, a second factor takes place at pressures in excess of 100 microns. This is the tendency of certain organic masking materials to be etched along with the organic layer 3, thus reducing the etching specificity. In the case where a customary (unpassivated) photoresist is employed as the mask 4, the preferred pressure is in the vicinity of 100 microns. With a photoresist passivated (in the manner to be described below) one may select a higher pressure. While other masking materials may permit higher pressure limits than 100 mm, none appear to permit operation above a practical upper limit of 300 microns.

Thus, when the conditions are optimized as set forth above, the etching of the sample proceeds in highly efficient and accurate manner. The etching process produces minimal sample heating. Sample temperatures rarely exceed 100° – 200°C, and most frequently are only slightly warmed above room temperatures. In any event, the temperatures are well below those that produce a change in the suceptibility of materials to being etched by the plasma. This has definite benefits when one is processing temperature sensitive materials such as certain semiconductor devices or thermoplastic materials. In addition, a high degree of specificity is exhibited between the etching rate of differing organic materials permitting the use of certain convenient organic materials for masks.

Figure 2A:
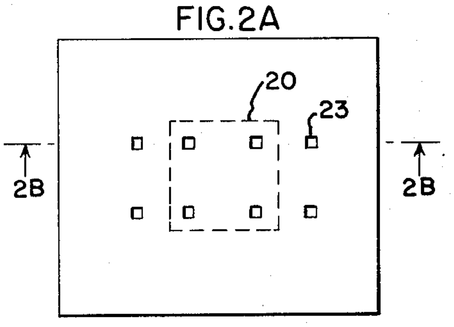
FIG. 2A is a plan view of a body member having an organic encapsulation member to be plasma etched having an apertured mask coated on the surface of the organic material.
Figure 2B:
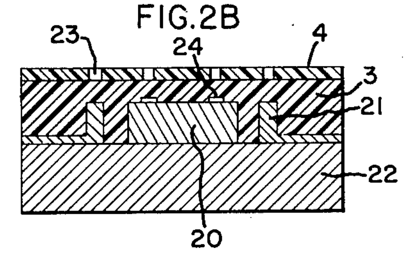
FIG. 2B is a cross sectional view of FIG. 2A taken along the plane 2B—2B.

In the plan view of FIG. 2A and the cross sectional view of FIG. 2B taken along the plane 2B—2B in FIG. 2A there is illustrated in greater detail the body member 1. This member is composed of an integrated circuit structure comprising a semiconductor chip 20 and metal electrodes 21 mounted on a dielectric substrate 22 and encapsulated by a cover layer 3 of organic material. Overlaying the organic layer 3 is a plasma etch mask 4 having apertures 23 aligned with the electrodes 22 and contact electrodes 24 on the chip. In the etch process the plasma attacks the organic layer 2 through the apertures 23, etching down to the metal electrodes. This permits electrical connections to be made between the electrodes 23 and 24.

In one preferred embodiment of the invention under consideration, the organic material was a fluorinated ethylene propylene, more commonly referred to as FEP Teflon. The plasma etch mask 4 may be composed of an inorganic metal such as aluminum, copper or any number of metals which will resist plasma attack. However, it is ordinarily more convenient to form the mask of an organic photoresist material, such as Shipley AZ-111, Dupont Riston or photopolymer Phodar, which are found to be relatively resistant to the generated plasma in contrast with the FEP Teflon. The photoresist mask is more desirable because a simpler fabrication process may be employed in applying the photoresist material onto the surface of the Teflon and etching apertures therein at precise points.

The coating process using the photoresist mask Shipley AZ-111, a positive photoresist material, may be performed as follows: The photo-resist material is sprayed onto the surface of Teflon to a uniform thickness of about one-half mil. This has been done by successive coatings. After drying, the photoresist is exposed through a registered photomask to ultraviolet light, the photomask defining the pattern of apertures to be made in the photoresist layer. Since a positive photoresist material is being considered, the areas of the photoresist to be removed are exposed. Upon developing the photoresist in a suitable etch solution, the exposed areas are dissolved away down to the organic layer. Thus, the apertured photoresist mask is formed and the body member 1 prepared for the plasma etch process.

The etching process has had particular application in the creation of electrical interconnections between electrical terminals on a generally planar substrate. As previously indicated, the electrical terminals are disposed around the planar substrate and are covered by a thin layer of dielectric material. The etching process creates small holes immediately over the terminals and exposes the terminals for subsequent metallization steps. In these applications the successive conductive and insulative materials are present in thin layers requiring carefully defined boundaries. The thickness of the dielectric layer requiring removal rarely exceeds a few thousandths of an inch and the thickness of the conductive layers are usually slightly smaller. A thermoplastic material which has had very satisfactory electrical and mechanical properties for this application and which has been particularly susceptible to plasma etching has been fluorinated ethylene propylene. Other fluorinated polymers such as tetrafluoroethylene (TFE) exhibit the same etching susceptibility. A variety of materials have provided high resolution etching masks. The photoresist materials mentioned above are the most convenient for high resolution applications. These materials are also laid down in thin layers ordinarily on the order of a thousandth of an inch. Each of these materials appears to be much less susceptible to attack by the plasma than the fluorinated dielectric and therefore are particularly excellent for this application.

The reason for specificity in the etching rate as between the organic mask and the fluorinated dielectric appears to be based in part upon the chemical properties of the involved materials and in part upon the specific plasma conditions resulting from the apparatus and operating conditions described above.

The chemical explanation applies to the family of fluorine saturated polymers on the one hand and to a quite heterogeneous family of organic solids on the other hand. The etching susceptibility of the fluorinated polymers appears to stem from the fact that the inner carbon bonds in the backbone of the fluorinated polymers are of relatively low energy in relation to the fluorine bonds to the carbon atoms themselves. Accordingly, when the plasma etching proceeds, the backbone is quite susceptible to attack and it proceeds to "unzip" the polymer chains and form gaseous reaction products. These gaseous reaction products are liberated into the vacuum and leave the situs of the reaction. This lesser susceptibility to plasma etching exhibited by a variety of organic solids in contrast to fluorinated polymers is shared by certain photoresists.

Photoresists are classes of materials used in photofabrication whose chemical nature is so altered as a result of exposure to light as to affect their subsequent solubility in a suitable liquid developer. They are classed as negative resists when exposure to light reduces the solubility of the exposed region in respect to the nonexposed regions. Positive resists exhibit the converse behavior, becoming more soluble to developer in exposed regions. The members of the class of negative photoresists may be laid down either as a dry film or as a liquid coating which later dries. The masks are then developed by an organic solvent such as xylene. The usual explanation of their light induced chemical change is that the material becomes cross linked or photopolymerized. A group of positive photoresists, such as AZO photoresists, after exposure appears to have a differential solubility to an acidic or caustic solution, the exposed regions becoming thereafter more soluble. In the case of the Shipley positive photoresist, the development entails use of a mild caustic solution, exposure tending to form soluble acidic groups.

Members of both classes of photoresists may be used to form masks. The dry film resists are particularly convenient in forming a continuous layer over an irregular underlayer and have been particularly successful.

As indicated, the mechanism for differential susceptibility appears to lie in the chemical differences between the photoresist and the FEP. Under controlled plasma attack it appears that subtle changes are made in a number of bonds within the photoresist as oxygen is substituted or radicals oxidized but the process is not accompanied by rapid physical deterioration. If the etching proceeds at high plasma densities, resistance of the photoresist to etching falls off very rapidly and the specificity of the etching process is reduced. However, if the etching proceeds in a carefully controlled manner which does not appreciably raise the temperature of the plasma or its density beyond the limits taught, the photoresist shows substantial immunity to attack by the plasma within the times required for removing the required thickness of FEP.

In accordance with a second process, the sole invention of D. J. LaCombe and the subject of a separately filed patent application, Ser. No. 150,503 filed June 7, 1973, the photoresist may be passivated to become substantially immune to attack by the plasma at higher pressure than 100 microns.

When unpassivated photoresist materials such as Shipley AZ-111 DuPont Riston, or Photopolymer Phodar, are used as masks in the plasma etching process, it is found that these materials are removed by the plasma at approximately one-tenth to one-twentieth the rate that the FEP is removed (at pressures of about 100 microns). Because of this finite etch rate, it is necessary to increase the minimum mask thickness to insure that the mask not be removed in the time required to etch away the desired thickness of FEP. This minimum is in addition to the thickness normally provided as a precaution against gaps at the edges and around surface irregularities in initially depositing the resist over the substrate.

In the second process, however, it has been found possible to reduce the etch rate of the photoresist to a level where it is inconsequential and does not require an additional thickness allowance. In accordance with this second process, plasma etching is initiated at a pressure below 100 microns. The photoresist is exposed to the plasma at this pressure for a period of approximately 10 minutes to produce "passivation," by which is meant that the photoresist has been made substantially immune to further attack by the plasma. Thereafter the pressure may be increased to a value in the range of from 100 to 300 microns, suitable for optimum removal of the FEP.

After passivation in this manner, the mask is not affected by plasma even though the pressure of the plasma is now increased to a level where the etching rate would have been quite substantial for an unpassivated photoresist. When the passivated photoresist is examined, it may be seen to have darkened slightly and to exhibit a rather significant decrease in solubility to acetone. Since the passivation is accompanied by these physical changes, it appears that the result is in fact a chemical change occuring at the surface of the photoresist. Once this has occurred, the photoresist continues to retain its mechanical integrity while becoming immune to further attack by the plasma under the indicated conditions.

With the mask passivated in this means it is possible to reduce the thickness of the mask to a smaller minimum consistent with achieving a continuous coating over the dielectric layer. Consequently, since thinner layers of resist may be used and since a higher plasma pressure may be used during the etching process, passivation permits more rapid and more uniform processing.

One specific embodiment of a plasma reaction chamber 30 such as may be employed in FIG. 1, is illustrated in the partially broken away perspective view of FIG. 3. The chamber 30 includes a tubular glass structure 31 having a middle flat region of rectangular configuration. An organic body member 32 overlayed by an apertured mask 33 is mounted within the tube 31 on a dielectric plate 34. The masked surface is spaced from the tube inside surface by in the order of 75 mils to ¼ inch, this distance being adjusted for providing an optimum plasma etch as earlier described for different organic samples. A metal electrode 35, in a specific example aluminum, contacts the top surface of the glass tube 31. At one end the tube is sealed to a metal rim 36 having an input port 37 for introducing an oxidizing gas into the tube. A hinged door 38 is sealed by an O-ring 39 to the metal rim 36. The opposite end of the tube 31 is sealed to a metal rim 40 having an output port 41 for carrying away the reaction products of the plasma etch process. The rims 36 and 40 are connected to ground so that a dielectric field is applied between the electrode 35 and rims 36 and 40. The electric field generates an intense plasma in the region below the electrode 35 and above the body member 32 which plasma etches the organic material through the apertured mask 33.

In FIG. 4 is illustrated in perspective view, partially broken away, a further embodiment of a plasma reaction chamber 50. The chamber 50 includes a circular aluminum base 51. An aluminum ring 52 having O-rings 53 and 54 at top and bottom edges is mounted on the base 51, being vacuum sealed to the base by O-ring 53. A glass substrate 55 is fitted snugly within the ring 52 and is supported by spacer shims 56. A top glass plate 57 is placed over ring 52 and sealed by O-ring 54. A body member 58 comprising organic material is supported on top of the substrate 55. The member 58 is overlaid by an apertured mask 59 spaced in the order of 75 mils to ¼ inch from the top plate 57. A circular electrode 60 rests on top of the glass plate 57. The base 51 is grounded, and an electric field is applied between the electrode 12 and base 51, with the substrate 55 influencing the configuration of the gas discharge so as to generate an intense plasma in the region above the body member 58.

The base 51 is provided with an input port 61 which is connected to an input passage 62 which extends through the glass substrate 55 and introduces an oxidizing gas into the upper compartment of the chamber 50 where the body member 59 is located. The glass substrate further includes a pair of passages 63 in the base 53 and substrate, which passages are commonly connected to an output port 64 for carrying away reaction products.

Figure 5:
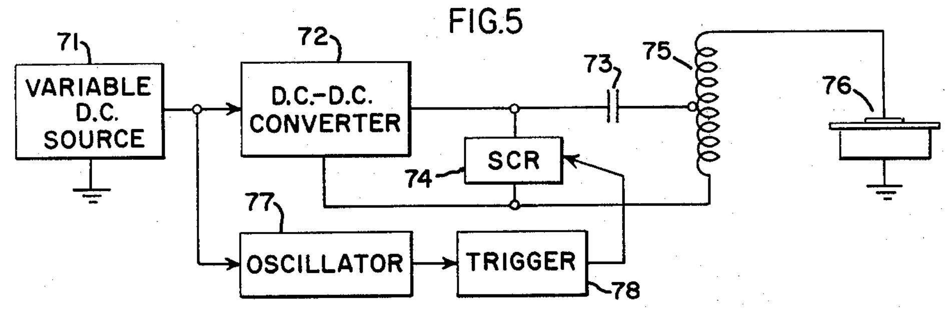
FIG. 5 is a simplified schematic diagram of a second plasma generating system in accordance with the invention.
Figure 6:
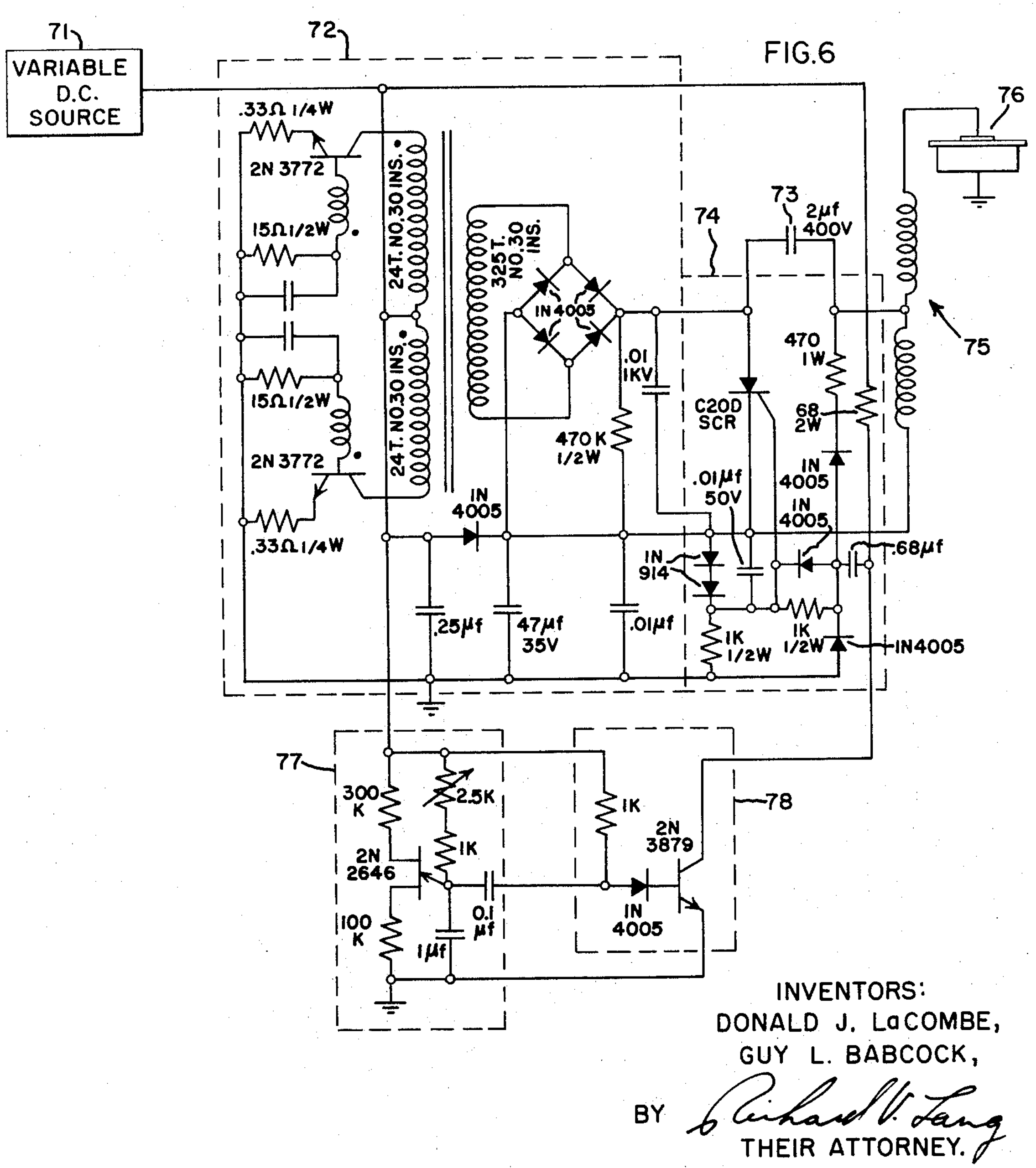
FIG. 6 is a more detailed schematic diagram of said second plasma generating system.

FIGS. 5 and 6 illustrate a second plasma generating system wherein a capacitive discharge is used to establish the high voltage fields required for generating the plasma. The apparatus of FIG. 1, it may be recalled, depends upon the periodic interruption of current through a Tesla coil. Interruption of this current causes a periodic collapse of the electromagnetic field surrounding the coil and the energy provided by the collapsing magnetic field creates the high voltage output used for generating the plasma.

FIG. 5 shows a capacitor discharge system in a simplified block diagram form. The system derives its power from a variable flow voltage source 71 of approximately 24 volts coupled to a d.c. to d.c. converter 72. The converter 72 produces a d.c. output voltage of approximately 350 volts. The output voltage from the converter 72 is used to charge a capacitor 73 having a capacity of 2 microfarads. This capacitor is coupled to a low voltage primary tap on the autotransformer 75. The high voltage secondary terminal of the autotransformer is coupled to the upper electrode 70 of the plasma etching chamber 76. During charging, the capacitor 73 is charged to the output voltage of the converter 72 through a path including the primary winding of the autotransformer 75 and returning to the negative terminal of the converter 72. An SCR device 74 is provided for discharging the capacitor 73 through the primary winding of the autotransformer. The SCR device is provided with a control connection to the oscillator 77 and trigger device 78. When the SCR device 74 is made conductive, it connects the charged capacitor 73 directly across the low impedance primary winding of the autotransformer 75. This causes a generally oscillatory discharge of the capacitor through the primary winding producing a high voltage in the secondary of from 10,000 to 40,000 volts, dependent upon load conditions.

Control of the SCR firing rate is achieved by the oscillator 77 mentioned above. Its frequency is externally adjustable in the range of from 100 to 600 cycles per second. The oscillator 77 operates the trigger circuit 78, which turns the SCR on and off at the oscillator frequency. The natural resonant frequency of the autotransformer output circuit is from 1 to 2 kiloherz and is not adjustable.

In addition to adjusting the frequency of the oscillator 77, it is ordinarily desirable to be able to adjust the output voltage of the autotransformer 75. This is done by adjustment of the voltage of the d.c. source 71. Ordinarily, a range of from 20 – 30 volts is quite adequate, bringing about a corresponding range is output voltage. A practical circuit diagram including the circuit and component values is illustrated in FIG. 6.

The foregoing power supply circuit is thus adjustable both with respect to the applied voltage and with respect to the repetition rate of the capacitor discharge. These controls are frequently desirable in optimizing the etching process. The actual cyclical frequency of the discharge is not critical and has been used successfully over a frequency range of from 1 to 2 kilocycles to low microwave frequencies.

It may be appreciated that the invention is not intended to be limited to the specific embodiments disclosed herein, but may be modified by those skilled in the art without exceeding the inventive concepts taught. Thus, the plasma reaction chamber can have a construction different from that illustrated. For example, in the embodiment of FIG. 4, the metal ring wall may be deleted and the glass substrate supported directly on the metal base with only an O-ring employed between the top plate and glass substrate.

What is claimed as new and desired to be secured by Letters Patent of the United States is:

1. A method for selective plasma etching of a fluorinated polymer layer on a member comprising:

a. applying an apertured mask over one surface of said organic layer, b. placing the member bearing said organic layer in a vacuum chamber, c. providing a flow of gas over said layer suitable for forming a plasma at a pressure in the range of from 70 to 300 microns of mercury, and d. means for establishing a large magnitude alternating electric field for exciting said gas to form a low temperature plasma within said chamber to etch the exposed portions of said organic layer.

2. A method for selective plasma etching of an organic layer as set forth in claim 1 wherein:

a. said reduced pressure providing a predetermined electronic mean-free path, b. said field is established by a planar electrode with an insulating layer between it and the plasma, and wherein c. said organic layer is disposed at a distance from said electrode insulating layer approximating one electron mean-free path to locate said organic layer in a plasma region containing the most active gaseous species.

3. A method of selective plasma etching as in claim 2 wherein said organic layer is composed of fluorinated ethylene propylene.

4. A method for selective plasma etching as set forth in claim 2 wherein said apertured mask is a thin layer of material capable of selective removal by a photolithographic technique.

5. A method for selective plasma etching as set forth in claim 2 wherein said apertured mask is an organic photoresist.

6. A method for selective plasma etching as set forth in claim 2 wherein the active gas is a species of oxygen.

7. A method for selective plasma etching as set forth in claim 5 wherein said photoresist is a negative working dry film.

8. A method for selective plasma etching as set forth in claim 5 wherein said photoresist is a positive working type.

9. A method for selective plasma etching of an organic layer as set forth in claim 2 wherein said electric field is an alternating field.

* * * * *